United States Patent [19]
Robinson et al.

[11] Patent Number: 5,523,839
[45] Date of Patent: Jun. 4, 1996

[54] DIFFERENTIAL OPTICAL INTERFEROMETRIC PROFILOMENTY FOR REAL TIME MANUFACTURING CONTROL

[75] Inventors: Glen M. Robinson, Stillwater; Timothy B. Carlson, Minneapolis; Richard W. Peterson, St. Paul; Steven M. Denzer, Inver Grove Heights; Robert P. Groschen, Jr., White Bear Lake; Michael J. Schmainda, Hutchinson, all of Minn.

[73] Assignee: Minnesota Mining & Manufacturing, St. Paul, Minn.

[21] Appl. No.: 203,003

[22] Filed: Feb. 28, 1994

[51] Int. Cl.⁶ .................................................. G01B 9/02
[52] U.S. Cl. ........................ 356/349; 356/351; 356/359
[58] Field of Search ................................. 356/345, 349, 356/351, 357, 359, 360

[56] References Cited

U.S. PATENT DOCUMENTS

| | | | |
|---|---|---|---|
| 3,796,495 | 3/1974 | Laub | 356/349 |
| 4,353,650 | 10/1982 | Sommargren | 356/351 |
| 4,848,908 | 7/1989 | Huang . | |
| 4,948,251 | 8/1990 | Komdo . | |
| 4,978,219 | 12/1990 | Bessho | 356/349 |
| 5,139,336 | 8/1992 | See et al. | 356/349 |

FOREIGN PATENT DOCUMENTS

92/03697  3/1992  WIPO .

OTHER PUBLICATIONS

See et al., Scanning differential phase contrast optical microscope: application to surface studies, Applied Optics, vol. 24 No. 15, pp. 2373–2379, Aug. 1, 1985.
Sommargren, Gary; Optical heterodyne profilometry, Applied Optics, vol. 20 No. 04, pp. 610–618, Feb. 15, 1981.
Robinson et al.; Applications of Interferometric Measurements of Surface Topography of Moving Magnetic Recording Materials; IEEE Transaction on Magnetics, vol. Mag 20, No. 5, (1983) (to be published).
Robinson et al.; The Analysis of Interferometrically Measured Surface Roughness Data, Proceedings of the Sixth International Conference on Video Audio, and Data Recording, University of Sussex, Brighton, England, (to be published) Mar. 17–21 1986.
Peterson et al.; Interferometric Measurements of the Surface Profile of Moving Samples; Applied Optics, vol. 23 No. 10/15, pp. 1464–1466, May 1984.
Robinson et al.; Optical Interferometry of Surfaces; Scientific American, pp. 66–71, Jul. 1991.
Cho et al.; Measurement of the local slope of a surface by vibrating–sample heterodyne interferometry: a new method in scanning microscopy; Optics Letters, vol. 18 No. 3, pp. 232–234, Feb. 1, 1993.
See et al.; Scanning differential optical profilometer for simultaneous measurement of amplitude and phase variation; Appl. Phys. Lett. 53(1), pp. 10–12, Jul. 4, 1988.

*Primary Examiner*—Samuel A. Turner
*Attorney, Agent, or Firm*—Patterson & Keough

[57] ABSTRACT

The present invention is an on-line manufacturing process control system and method using a twin or dual beam heterodyned optical interferometer as the monitor of changes in the surface characteristics of an object while the object is being manufactured. The changes in the surface characteristics can then be used as data by automated equipment either to determine whether the manufactured object monitored at a given time meets predetermined quality standards or to automatically alter various individual phases of the manufacturing process in order for the surface characteristics of the manufactured object to conform to predetermined quality standards.

42 Claims, 3 Drawing Sheets

DIFFERENTIAL OPTICAL INTERFEROMETRIC PROFILOMENTY FOR REAL TIME MANUFACTURING CONTROL

FIELD OF THE INVENTION

This invention relates generally to a surface roughness optical measuring apparatus and method and in particular to optically measuring on-line the surface roughness of a product during the manufacturing process.

BACKGROUND OF THE INVENTION

Interferometry has been known and studied for many years. In its simplest form optical interferometry involves creating a beam of light which is split into a measuring beam and a reference beam so that the measuring beam is reflected off of the test item and the reference beam is reflected off of a fixed object, the two beams are recombined, and an interference or fringe pattern is created which is proportional to the phase difference imparted on the measuring beam by the surface of the test object. Considerable improvement and efficiency has been achieved over the years, particularly with the development of laser light sources. Monochromatic coherent light allows for greater accuracy and sensitivity in determining minute variations in measuring parameters such as indices of refraction, phase, amplitude, and polarity.

Numerous methodologies exist for analyzing surface characteristics, but all of these have the disadvantage of requiring a specimen to be mounted within an optical interferometer for accurate analysis. There does not yet exist a system capable of on-line precise surface roughness measurement of a product, such as a film, sheeting, or web, during the manufacturing process.

An example of an apparatus and method for surface measuring using phase interferometry is U.S. Pat. No. 3,796,495 issued to Laub on Mar. 12, 1974, which uses laser light to create a measuring beam. The Laub invention uses an acousto-optical modulator of variable frequency to create two measuring light beams which have slightly different frequencies at the optical centers of the two beams. These two beams are then projected onto the surface of the test specimen. The beams have considerable physical space overlap as well as frequency overlap. However, there is a linear zone of interference occurring between the two beams at the surface of the test specimen. These two beams are recombined after reflection off of the test surface to re-create that interference. If the specimen surface is uneven, this linear zone becomes wavy in appearance and is represented on an oscilloscope, at which time a picture is taken and the specimen is moved slightly to get a picture of the next region.

The technique disclosed in the Laub patent is inefficient due to waste of the output light and because only a small portion of the area of beam incidence between the overlapping spots is usable to detect the phase displacement, or shear, between the frequency differentiated measuring beams. Furthermore, variability in the ramp generator to the acousto-optical modulator leads to fluctuations in the distance between optical centers of the two measuring beams. This will artificially introduce phase differences as the beam centers shift away from and toward each other. The Laub method is subject to temperature and vibrational contamination as well as fluctuations that may be caused by changes in the focal length and out of focus measurements.

Another example of a multiple beam interferometer is disclosed in international patent application WO92/0397, published Mar. 5, 1992. This application discloses an interferometer using two or more first-order beams derived from an acousto-optical modulator driven at two or more frequencies. The two or more beams are focused onto the test surface and on reflection from the surface are recombined with a separate reference beam to create the interference. The two measuring beams are electronically switched back and forth so that only one beam at a time is directed to the test surface. Despite the use of two measuring beams on the test surface, this apparatus is essentially two superimposed and parallel Michelson interferometers. This apparatus is less susceptible to vibration as compared to a single Michelson interferometer but it does not eliminate vibrational noise because of its reliance on a separate stationary reference beam to create the interference. Other difficulties with this apparatus relate to the use of two or more beams differentiated by frequency, which requires intervening electronic switching between measurements from one beam to the next.

A third example of a multiple beam interferometer is disclosed in U.S. Pat. No. 5,139,336 issued to See et al. on Aug. 18, 1992. The patent discloses a heterodyned interferometer using amplitude modulation as well as different frequencies between the two measuring beams. The device either uses a zero order and one first-order beam for measuring a surface or it incorporates at least two driving frequencies for a Bragg cell acousto-optical modulator to create two first-order beams of different frequency. In either case the measuring beams undergo amplitude modulation. As disclosed, this device is affected by surface color and reflectivity changes.

There does not yet exist a system and method teaching on-line interferometry for use during a manufacturing process to control that manufacturing process. Difficulties due to vibration within the system, movement of the test specimen, color, chemistry, reflectivity changes, changes in amplitude, background electronic noise, and temperature fluctuation can all introduce significant error into the measurements obtained by an interferometer. Available systems do teach methods and systems that are able to control these variables, but do so by removing test specimens from a manufacturing process. Each specimen is then tested in a controlled environment and may not produce reliable test results representative of the entire amount of product from which the sample is taken.

SUMMARY OF THE INVENTION

The invention discloses a method and system for measuring surface characteristics of a specimen while that specimen is moving or in a manufacturing process. The invention is adaptable to numerous manufacturing processes that use on-line surface characteristic monitoring to control the quality and quantity of the products generated by that manufacturing process. The present invention makes use of a twin or dual beam heterodyned optical interferometer coupled to a manufacturing process to accomplish the surface characteristic monitoring.

The twin or dual beam heterodyned optical interferometer is designed to minimize interference and background noise due to changes in signal amplitude, color, surface chemistry, surface vibration, surface motion, and degradation of signal due to beam focus discrepancies. All of these limitations are minimized through the use of two monochromatic coherent radiant energy beams directed onto the surface to be measured, the two beams being distinguishable by the polarity difference between them. In this way the two beams act as a reference to each other with the change imposed on the beams by the interaction of the two beams with the surface detectable as a phase shift relative to the two beams. The phase shift detected between the two beams is equated to a surface characteristic through the use of statistical analysis performed on the phase shift change data.

Results of the statistical analysis are used to control manufacturing process parameters in a feedback control fashion at various stages of a manufacturing process. High speed integrated computer hardware and software programming allows for rapid feedback control of a manufacturing process using optical interferometry as a monitoring tool.

The computer interface also allows detection of abrupt or large changes in the phase shift between the two beams which signifies gross errors or defects in the surface undergoing measurement. Data collected in this fashion is useful as a quality assessment parameter for the manufacturing process.

Another application of the invention is the on-line monitoring of fine motion attributes of an object. The invention would yield information representative of the object's motion consistent with changes in pitch and roll.

DETAILED DESCRIPTION OF THE PREFERRED EMBODIMENT

Figure 1:
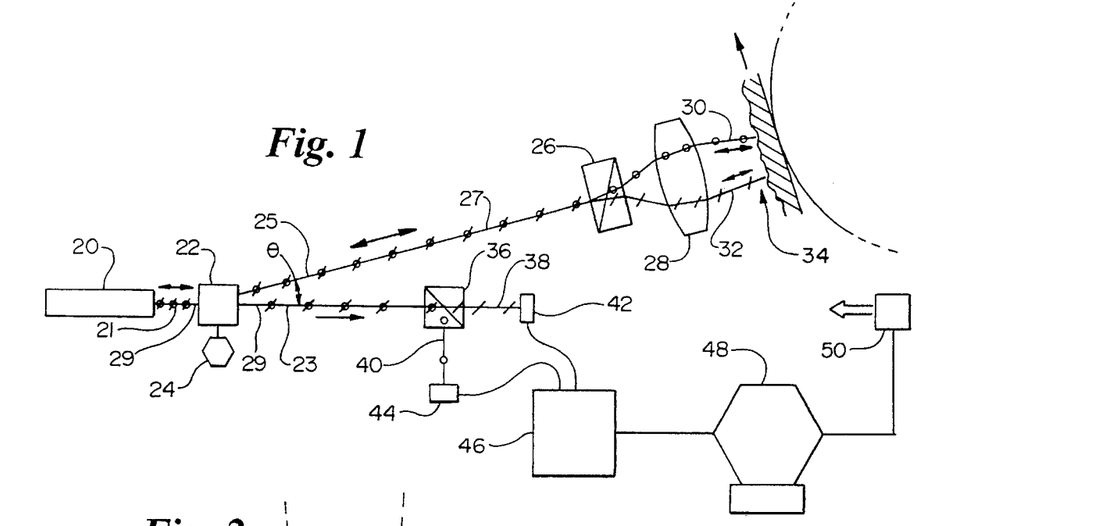
FIG. 1 is a schematic representation of an embodiment of a twin beam heterodyned laser interferometer.

FIG. 1 discloses a twin beam heterodyned interferometer comprising laser source 20, acousto-optic modulator 22, frequency oscillator 24, refracting polarizer 26, focusing lens 28, polarizing beam splitter 36, photodetectors 42 and 44, comparator 46, computer 48, and manufacturing process control interface 50.

Laser source 20 provides a coherent monochromatic output light beam 21 of frequency $f_0$. Light beam 21 enters acousto-optic modulator 22. Acousto-optic modulator 22 uses an optical medium that is vibrated mechanically by a piezoelectric crystal driven by the output from frequency oscillator 24 at frequency $f_m$. The mechanical vibrations traverse the optical medium of acousto-optic modulator 22 perpendicular to the optical path of light beam 21. The vibration of the optical medium of acousto-optic modulator 22 creates a diffraction grating, diffracting light beam 21. In the present embodiment, frequency oscillator 24 provides a 40 MHz output, although a wide range of frequencies are available. The effect of acousto-optic modulator 22 is to create a zero order beam 23 and multiple nth order beams. The resultant zero order beam 23 is identical, except for amplitude, to the laser output light beam 21. A first-order output beam 25 is frequency shifted by an amount $f_m$ to $f_1$ which in the present embodiment is equal to $f_0$ plus 40 MHz and is diffracted off axis from zero order beam 23 by angle θ. The present invention uses the zero order beam and one of the first-order beams.

First-order light beam 25 from acousto-optic modulator 22 is directed to refracting polarizer 26, which is a Wollaston prism in the present embodiment. Refracting polarizer 26 creates two diverging orthogonal linearly polarized light measuring beams 30 and 32. Focusing lens 28 focuses the divergent polarized measuring beams 30 and 32 onto two separate sites of surface 34, which is the surface to be measured. Focusing of the two polarized measuring beams 30 and 32 ensures the smallest spot size possible at each site, as well as the brightest spot, to maximize the amount of light reflected from surface 34 back along the paths of each polarized measuring beams 30 and 32. Since polarized measuring beams 30 and 32 are incident with surface 34 at separate sites, the optical path lengths of these two orthogonal linearly polarized beams are different. The path length difference information is proportional to the phase change between the two measuring beams 30 and 32.

Reflected measuring beams 30 and 32 travel the reverse path of original beams 30 and 32. Since only the light reflected back along the original light path of beams 30 and 32 is used, some light intensity is lost due to scattering effects of surface 34. Measuring beams 30 and 32 are converged at lens 28 and refracting polarizer 26, and are recombined into a single measuring beam 27 of frequency $f_1$ along a path back to acousto-optic modulator 22.

Upon re-entering acousto-optic modulator 22 in reverse fashion along the path of first-order output beam 25, combined measuring beam 27 is diffracted and frequency shifted in acousto-optic modulator 22 by an amount equal to the frequency output of frequency oscillator 24. Then, the portion of the beam emerging from acousto-optic modulator 22 in the reverse path is a measuring beam 29 and is now frequency shifted twice $f_m$ to $f_2$, which in the present embodiment is $f_0$ plus 80 MHz. Measuring light beam 29 travels in the reverse direction of beam 21 back to an output mirror of laser 20.

Upon reflection off the mirror of laser 20, measuring beam 29 is superimposed with $f_0$ light in light beam 21 from laser 20. This superimposition of $f_2$ light with $f_0$ light sets up an interference with a beat frequency of twice $f_m$, or 80 MHz.

Super-imposed $f_0$ and $f_2$ light passes through acousto-optic modulator 22. Polarizing beam splitter 36 is aligned to receive the emerging zero order beam 23 of frequency $f_0$ and zero order beams 29 of frequency $f_2$. Polarizing beam splitter 36 splits beams 23 and 29 into orthogonal linearly polarized beams 38 and 40 emerging from polarizing beam splitter 36 substantially at right angles to each other. Polarized beams 38 and 40 carry their respective polarized components from beams 30 and 32, but at frequency $f_2$. The orthogonal linearly polarized components of beam 23 provide the beat frequency interference that can be detected. Photodetectors 42 and 44 detect beams 38 and 40 and the outputs of detectors 42 and 44 are sent to comparator 46. Since beams 38 and 40 each contain $f_0$ and $f_2$ interfering components, the beat frequency of beams 38 and 40 is detected by comparator 46. Comparator 46 uses an analog to digital converter to translate the two beat frequency beams into digital format to carry out the comparison of the beams. The phase shift imposed upon beams 30 and 32 by the surface irregularities of surface 34 are represented in the phase shift calculated by comparator 46 between the beat frequencies of beams 38 and 40.

Figure 2:
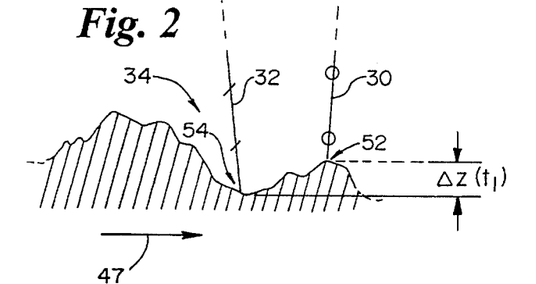
FIG. 2 is a schematic representation of the interaction of the twin beams on a surface of a moving object at time $T_1$.
Figure 3:
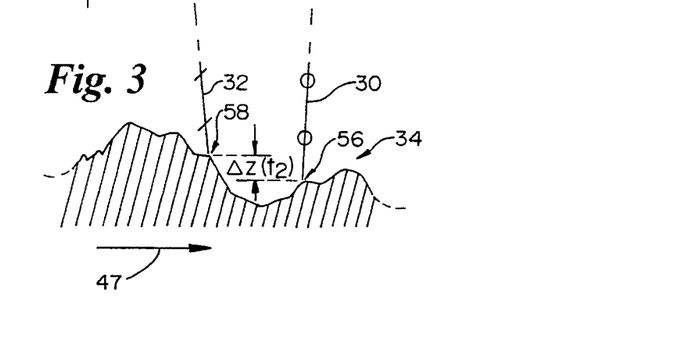
FIG. 3 is a schematic representation of the interaction of the twin beams on a surface of a moving object at time $T_2$.
Figure 4:
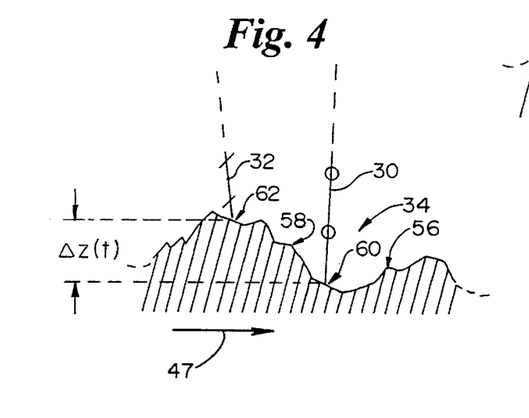
FIG. 4 is a schematic representation of the interaction of the twin beams on a surface of a moving object at time $T_3$.

FIGS. 2–4 schematically depict measuring beams 30 and 32 incident to surface 34, which is moving in the direction of arrow 47. Difference in surface height, or asperity, causes a difference in path length between measuring beams 30 and 32, this path length is proportional to twice the actual height asperity, or $\Delta Z$. As shown in FIG. 2, representing time frame $t_1$, measuring beam 30 is incident at surface site 52 and measuring beam 32 is incident at surface site 54. The actual surface height difference is equivalent to $\Delta Z(t_1)$. Measuring beam 32 must travel twice the distance $\Delta Z(t_1)$, and the phase change $\Delta\theta$ imparted on measuring beam 32 will be proportional to $2\Delta Z(t_1)$. As surface 34 moves over time, by time $t_2$, shown in FIG. 3, measuring beams 30 and 32 are now incident at two new sites 56 and 58 separated in height by $\Delta Z(t_2)$. Note that the path length for measuring beam 30 is now longer by $2\Delta Z(t_2)$ which will lead to a relative phase change in the opposite direction from the phase change detected at time $t_1$. The system is able to track the phase change through the four quadrants of the unit circle. If a $\Delta Z(t)$ increases beyond ½$\lambda$ of the light, the $\Delta\theta$ values repeat as a function of the unit circle in trigonometric functions. The invention tracks $\Delta\theta$ changes through the four quadrants of a unit circle, keeping track of the number of occurrences of apparent phase reversal. By doing so, large $\Delta Z$'s such as the example shown in time frame $t_3$, depicted in FIG. 4, are accurately detected as multiples of $2\pi$ as the path of measuring beam 30 lengthens over the distance from site 56 to site 60 and the path of measuring beam 32 shortens over the distance from site 58 to site 62.

A calculation of phase shift as a function of path length difference is accomplished electronically by a quadrature phase demodulator circuitry within comparator 46. The outputs of detectors 42 and 44 can be mathematically modeled as:

$$\text{Signal 1 from detector 42} = A \sin(\omega t + \phi_a(t)), \text{ and} \quad (1)$$

$$\text{Signal 2 from detector 44} = B \sin(\omega t + \phi_b(t)). \quad (2)$$

Where A is signal amplitude from detector 42, B is signal amplitude from detector 44, $\omega$ is the radial frequency of the signals, t is time, $\phi_a(t)$ is the time dependent phase shift of signal 1, and $\phi_b(t)$ is the time dependent phase shift of signal 2.

Signal 1 is processed by a power splitter into signals 3 and 4 which are identical except for decreased signal amplitude:

$$\text{Signal 3} = A' \sin(\omega t + \phi_a(t)), \text{ and} \quad (3)$$

$$\text{Signal 4} = A' \sin(\omega t + \phi_a(t)). \quad (4)$$

Signal 2 is processed by a separate power splitter into signals 5 and 6, each having lower amplitude but signal 6 is also delayed by 90°:

$$\text{Signal 5} = B' \sin(\omega t + \phi_b(t)), \text{ and} \quad (5)$$

$$\text{Signal 6} = B' \cos(\omega t + \phi_b(t)). \quad (6)$$

Signals 3 and 6 are sent to one mixer and signals 4 and 5 are sent to a second mixer. The mixed signals are filtered through a low pass filter yielding:

$$\text{Signal 7} = \frac{A'B'}{2} \cos(\phi_a(t) - \phi_b(t)), \quad \text{eq. 7}$$

and $$\text{Signal 8} = \frac{A'B'}{2} \sin(\phi_a(t) - \phi_b(t)). \quad \text{eq. 8}$$

Signals 7 and 8 are digitized by an A/D converter in comparator 46 and sent to computer 48. Computer 48 divides signal 8 by signal 7 yielding:

$$\frac{\text{Signal 8}}{\text{Signal 7}} = \tan(\phi_a(t) - \phi_b(t)). \quad \text{eq. 9}$$

Notice that the amplitude coefficients cancel out. The expression $(\phi_a(t) - \phi_b(t))$ is equivalent to $\Delta\phi(t)$, which is proportional to $2\Delta Z$ representing the beam path length difference between measuring beams 30 and 32. Substituting and solving for $\Delta Z$ yields the following equation:

$$\Delta Z(t) = \frac{\lambda \Delta\phi(t)}{4\pi} \quad \text{eq. 10}$$

where $\lambda$ is the wavelength of the light used, and $\Delta Z(t)$ is the time dependent height difference between the laser illuminated spots. The computer also keeps track of which quadrant of the unit circle each measuring point is in and is able to effectively demodulate phase differences greater than $2\pi$.

Phase shift data from comparator 46 is fed to computer 48 for statistical analysis of the phase shift changes as surface 34 moves past measuring beams 30 and 32. The phase shift information is then utilized by computer 48 to effect feedback control to the manufacturing process to keep the production process within the parameters set for the product.

Figure 5:
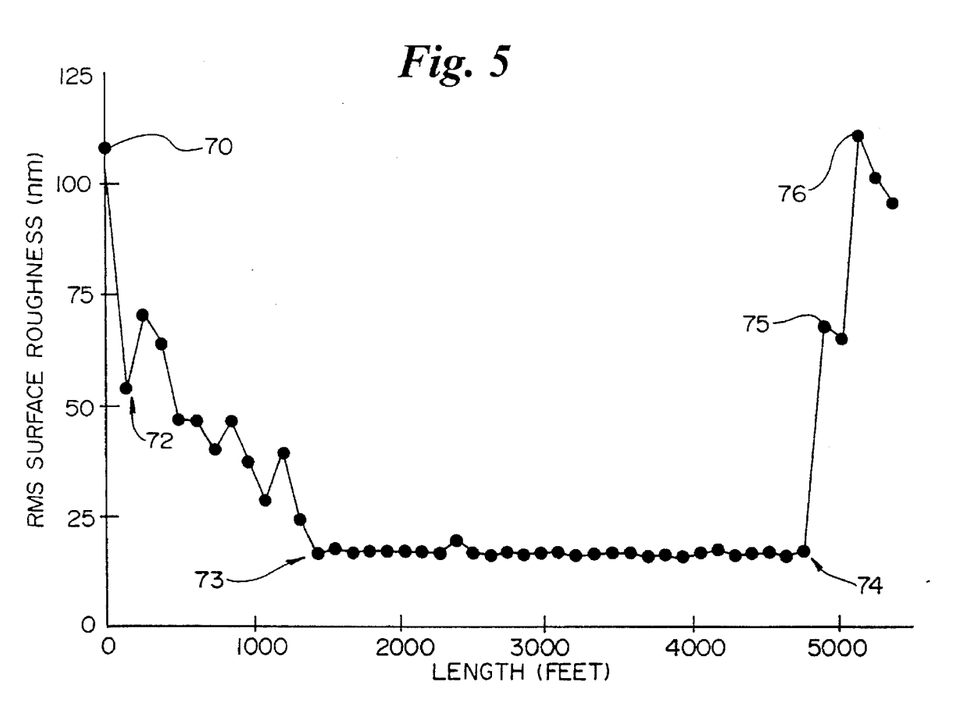
FIG. 5 is a graphic representation of statistical data received by a twin beam laser interferometer.

FIG. 5 is a graphic representation of data obtained by use of the invention during a manufacturing process. In this process, a plastic sheet in the form of a web is coated with a magnetic material to create a magnetic storage tape. The clarity of an audio or video signal reproduction obtainable from a magnetic tape is inversely proportional to the surface roughness of the magnetic coating. One such manufacturing method uses a smoothing apparatus and a series of calender rolls for literally squeezing the magnetic coating into a smooth surface.

As shown in FIG. 5, the length in feet of the polymer web is depicted at the bottom of the graph and is correlated to the root-mean-square (RMS) statistical surface roughness given in nanometers along the ordinate. Beginning at the 0 foot mark the smoothing apparatus is brought down onto the magnetic coating surface resulting in a change in surface roughness from point 70 to point 72. By point 73 approximately 1,400 feet of polymer webbing has been processed during which time the calender roll pressures have been adjusted to obtain an acceptable surface roughness of approximately 15 nm beginning at point 73. From point 73 to point 74 the manufacturing process is acceptable, as noted by the RMS surface roughness maintaining approximately a 15 nm value. At point 74 the calender rolls are opened and there is an almost immediate jump in surface roughness to a value of approximately 75 nm at point 75. At point 76 the smoothing apparatus is lifted causing an almost instantaneous rise in the RMS surface roughness in excess of 100 nm by point 76.

Through the on-line monitoring of the manufacturing process it can be determined from the graphic representation in FIG. 5 that the magnetic tape manufactured by this process is acceptable beginning at approximately the 1,500 feet mark out to approximately the 4,750 feet mark without any need to carry out surface roughness measurements of samples after manufacture.

Figure 6:
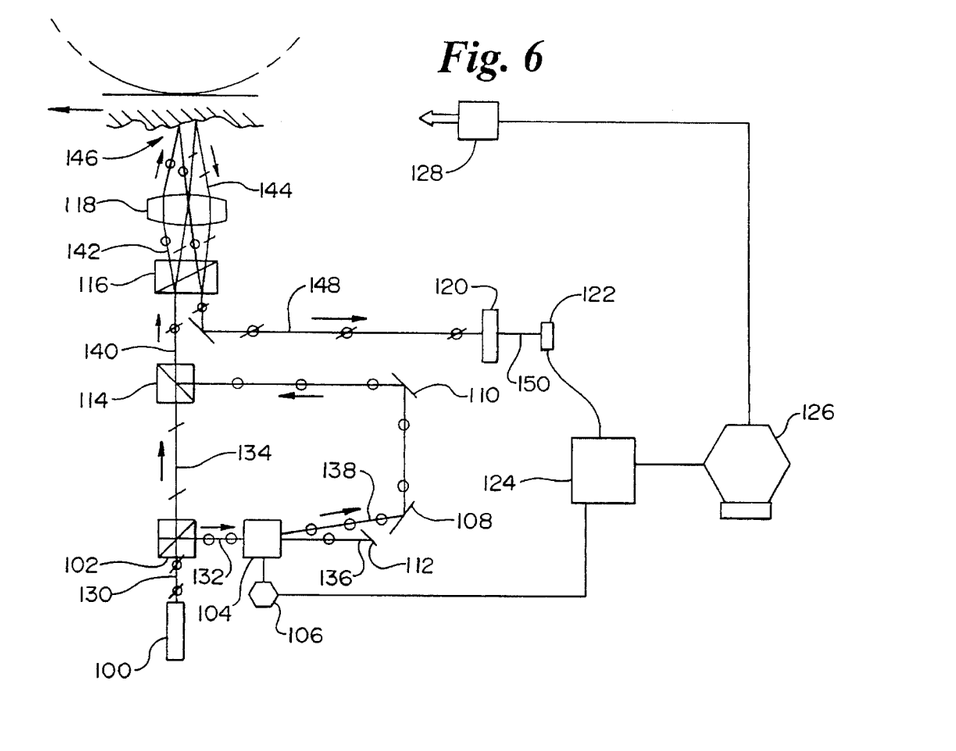
FIG. 6 is a schematic representation of another embodiment of the present invention depicting a dual beam heterodyned laser interferometer.

FIG. 6 is another embodiment of the invention comprising a laser 100, a polarizing beam splitter 102, an acousto-optical modulator 104 driven by frequency oscillator driver 106, alignment mirrors 108 and 110 and beam stop 112, beam aligner 114, refracting polarizer 116, focusing beams 118, polarizer 120, photodetector 122, comparator 124, computer 126, and manufacturing process control interface 128.

As depicted in FIG. 6, laser 100 provides a monochromatic coherent light beam 130 which is directed at polarizing beam splitter 102 creating orthogonal linearly polarized light beams 132 and 134. Light beams 130, 132, and 134 are all of the same frequency $f_0$. Light beam 132 is directed through an acousto-optic modulator 104 which contains an optical medium mechanically vibrated by a piezoelectric crystal driven by frequency modulator 106 at a frequency $f_m$. The mechanically driven optical medium of acousto-optical modulator 104 creates a diffraction grating within the acousto-optic modulator medium providing a zero order light beam 136 and at least one first-order light beam 138. Light beam 136 is directed into beam stop 112 and is not used. First-order beam 138 is frequency shifted by an amount equal to $f_m$ from $f_0$ to $f_1$. Beam 138 is directed by mirrors 108 and 110 to beam aligner 114 which superimposes beam 134 and 138 into beam 140. Refracting polarizer 116, which this embodiment is a Wollaston prism, separates beam 140 into orthogonal linearly polarized beam 142 having a frequency $f_1$ and beam 144 having a frequency $f_0$. Focusing means 118 is aligned off axis to focus beams 142 and 144 onto separate sites of surface 146. Focusing means 118 is positioned in such a fashion as to be in a position to gather in a substantial amount of the reflected light from beams 142 and 144 and direct the reflected beams 142 and 144 in a reverse fashion through refracting polarizer 116 recombining reflected beams 142 and 144 into measuring beam 148. Beam 148 is then directed through polarizer 120 which is aligned at 45° from the polarization axes of beams 142 and 144 combined within beam 148. Polarizer 120 in effect filters out all components of beam 148 except the beat frequency of super-imposed beams 142 and 144 allowing beat frequency beam 150 to arrive at photodetector 122. The signal from photodetector 122 as a beat frequency is compared in comparator 124 to the frequency oscillator driver signal from frequency oscillator driver 106 to arrive at a phase change for evaluation by computer 126 to characterize surface asperity of surface 146. A statistical analysis of the changing surface asperity of surface 146 is undertaken by computer 126 to arrive at a surface roughness value which is then utilized by manufacturing process control interface 128 to adjust the manufacturing process to control the degree of surface roughness on surface 146 within the parameters set by the manufacturing process.

Figure 7:
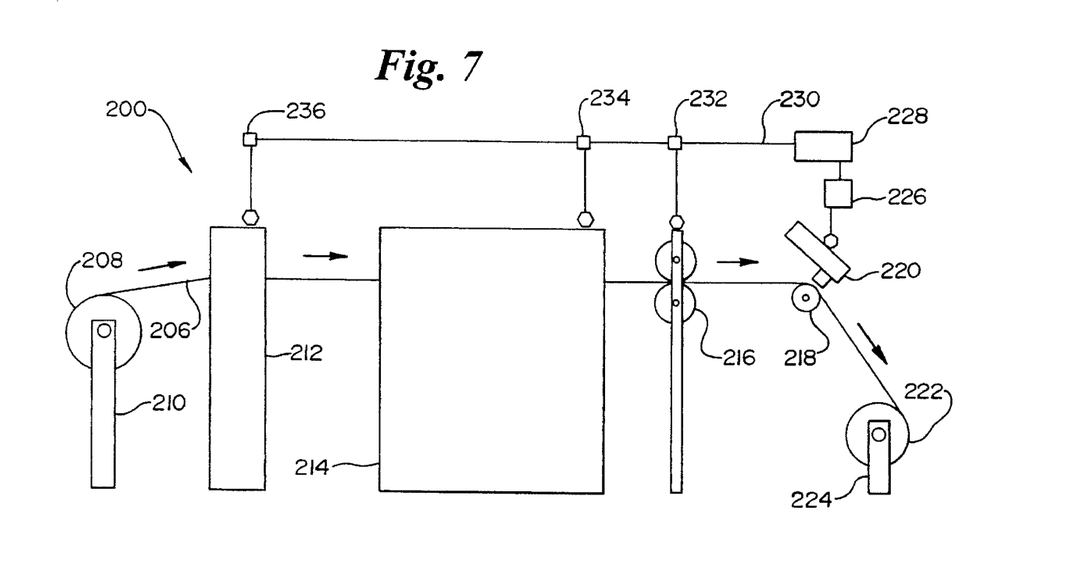
FIG. 7 is a schematic representation of a manufacturing process for magnetic media depicting on-line laser interferometer measurements of surface roughness and using the data collected to control the manufacturing process.

FIG. 7 depicts a manufacturing process using on-line interferometry for analysis of surface asperity of a product during the manufacturing process. As depicted, this embodiment uses a control interface allowing for feedback adjustment of the manufacturing process to control the level of surface asperity of the product during the manufacturing process. In the embodiment depicted in FIG. 7 a polymer web 206 is fed off of a polymer roll 208 mounted on a film unwind station 210. Polymer film web 206 is fed through coater station 212 where polymer film web 206 is coated with a magnetic film of desired thickness. Polymer film web 206 travels to oven 214 for drying and curing of the magnetic coating on polymer film web 206. From oven 214 polymer film web 206 travels through calender rolls 216 for compression of magnetic coating into a smooth surface on polymer film web 206. Polymer film web 206 next travels over roller 218 which acts as a tensioner for the polymer film web stabilizing its motion underneath the optics of interferometer 220. Polymer film web 206 is then taken up into roll 220 mounted on film wind up station 224.

As polymer film web 206 passes the optics of interferometer 220, surface asperity is measured by on-going comparison of the interferometer signal at comparator 226 and statistical analysis of this comparison by computer 228. Results of the continual statistical analyses provided by computer 228 are then passed via electronic connection 230 to manufacturing control substations 232, 234, and 236 which then control intermediate manufacturing process steps in the production of a magnetic coating such as: spreading blade tension, oven temperature, calender roll pressure, air flow, field strength of the orientation magnet, and web speed.

The present invention for on-line surface asperity measurement minimizes limitations associated with changes in amplitude, surface color, chemical composition, vibration and motion, and out of focus difficulties that are inherent in interferometers using separate reference beams. The only parameter remaining representing a difference between the two beams is the path length difference between the two beams. This invention for on-line interferometric measurement of surface asperity places two measuring beams onto the surface to be measured and the path length difference is compared between these two beams eliminating the need for a separate reference. In this way the two beams used by the invention act as a reference to themselves. Since both a measuring and a reference beam are incident to the surface being measured in close proximity to each other, variances due to amplitude, color, chemistry, vibration, motion, and difficulties with being out of focus are minimized or neutralized because all of these phenomena influence both beams virtually identically.

Since the two beams act as internal reference to each other there is no outside frame of reference against which to obtain an actual surface asperity value. The present invention overcomes this by statistically comparing sequential $\Delta Z$ using statistical correlation means. The more common statistical analysis is the root-means-square analysis. However, skewness, kurtosis average peak height analysis, slope roughness analysis, geometric mean analysis, variance analysis, and interquartile range statistical analysis are examples of some of the other correlation means which are also available.

Another useful aspect of the invention is detection of coating nodules and coating defects. Phase shifts of more than 180° between consecutive measurements is a limitation to the sensitivity of the present invention. However, this is overcome by increasing the frequency with which consecutive measurements are taken. During development of the invention it was noted that there were persistent occurrences of phase shifts greater than 180° between consecutive measurements regardless of the frequency that consecutive measurements were taken. An example of such a phase error is where the phase between measurements would increase greater than 180°, for example an increase by 290°. In this case the computer will show a change in phase of −70°. There is no way to correct this error since a 290° change is indistinguishable from an actual phase change of −70°. Such a jump greater than 180° is the equivalent of a quadrant skip on a unit circle, i.e. skipping from quadrant one to quadrant three or from quadrant two to quadrant four. These quadrant skips are not necessarily a problem because they occur at a very small percentage of all consecutive measurements. The significance of such quadrant skips has been determined to correspond to gross imperfections in the magnetic coating corresponding to nodules and pits in the coating surface.

By splitting the signal going from the interferometer to the analog-digital converter, and sending one part to a spectrum analyzer, by keeping track of the number of quadrant skips detected, a representative value for the number of nodules and pits occurring in the surface can be correlated. The incidents of nodules and pits in the surface of a magnetic tape represents what is known in the industry as dropout in the recording of a video or audio signal. Therefore, the number of nodules and pits occurring in a magnetic tape surface will directly influence the quality of the tape. Thus, keeping track of the frequency of nodules and pits detected is an additional utilization of on-line interferometric surface asperity measuring enhancing the sensitivity of the invention in determining quality of the surface manufactured. This is evident by considering a coated magnetic tape that may be extremely smooth but is still deemed of insufficient quality because of a high incidence of nodule and/or pit defects detected within the extremely smooth surface.

Another embodiment of the invention is for monitoring of an object's motion. A representative example is the monitoring of a magnetic pick-up during a read/write function to assess head motion for pitch or roll. Parameters can be designed to evaluate pitch and roll motion as a function of the accuracy that a magnetic pick-up head is able to read or write information to magnetic storage media. This feature of the invention would direct two beams of an optical interferometer onto a surface of a magnetic pick-up head. Phase shift changes between the two beams is then evaluated and calculated to compare statistically with motion of the pick-up head corresponding to pitch and roll. The amount of pitch or roll to the pick-up head's motion is then interpreted against pre-set parameters to assess accuracy of a read or write function carried out by the pick-up head.

We claim:

1. A method of optical interferometric measurement of a surface characteristic of a moving object as a part of the manufacturing process of the moving object comprising the steps of:

providing an optical interferometer for use with an object moving relative to the interferometer;

stabilizing the object in a beam direction relative to the interferometer;

measuring a surface characteristic of the object using the optical interferometer;

comparing the measured surface characteristic to a set of standard parameters of desired surface characteristics for the object; and controlling the manufacturing process of the object depending on the results of the comparison of the measured surface characteristic with the desired surface characteristic.

2. The method of claim 1 in which the step of providing the optical interferometer comprises the steps of:

providing a first beam of coherent light with frequency $f_1$ and a second beam of coherent light with frequency $f_2$;

polarizing the second beam into a third and a fourth beam of diverging orthogonal linearly polarized beams; and directing the third and fourth polarized beams onto separate sites of a surface of the object so that surface irregularities on the surface of the object impart a phase shift difference between the third and fourth polarized beams as those beams are reflected from the sites of the surface of the object.

3. The method of claim 2 further comprising the steps of:

collecting the third and fourth polarized beams reflected from the surface of the object;

recombining the collected third and fourth polarized beams into a fifth beam of frequency equal to the second beam; and superimposing the recombined fifth beam with the first beam into a sixth beam creating a beat frequency within the sixth beam.

4. The method of claim 3 further comprising the steps of:

polarizing the sixth beam into a seventh beam and an eighth beam of orthogonal linearly polarized beams having the phase difference of the third and fourth polarized beams and the beat frequency of the sixth beam;

comparing the phase difference between the seventh and eighth polarized beams to a path length difference between the third and fourth polarized beams; and correlating the difference in path length between the third and fourth polarized beams to a surface characteristic of the moving object.

5. The method of claim 1 in which the step of measuring comprises detecting a rate of surface defect occurrences and comparing the rate of occurrence of surface defects to a set of acceptable rates of defect occurrence.

6. The method of claim 3 further comprising the step of shifting the frequency of the fifth beam to a frequency $f_3$.

7. The method of claim 3 in which the step of collecting is selected from the of steps consisting of using: a lens, prism, mirror, or a retroreflective device.

8. The method of claim 1 in which the step of providing the optical interferometer comprises the steps of:

providing a coherent monochromatic light source of frequency $f_0$;

diffracting the coherent monochromatic light of frequency $f_0$ into zero and first-order beams;

frequency shifting the first-order beam by an amount $f_m$ frequency to a frequency $f_1$;

polarizing the first-order beam of frequency $f_1$ into two diverging orthogonal linearly polarized measuring beams $\beta 1$ and $\beta 2$, both of frequency $f_1$;

focusing measuring beams $\beta 1$ and $\beta 2$ onto a surface of the object at two distinct sites;

collecting a reflection of the measuring beams $\beta 1$ and $\beta 2$ phase shifted by the surface characteristics after incidence with the surface of the object;

recombining measuring beams $\beta 1$ and $\beta 2$ into a recombined measuring beam;

directing the recombined measuring beam back along a path of the first-order beam;

re-diffracting the recombined measuring beam;

frequency shifting the recombined measuring beam a second time to a frequency $f_2$ twice the $f_m$ frequency difference from frequency $f_0$;

superimposing the twice frequency shifted recombined measuring beam of frequency $f_2$ with the non-frequency shifted zero order light beam of frequency $f_0$ to create a beat frequency beam $\gamma$;

splitting the beat frequency beam $\gamma$ into two orthogonal linearly polarized beat frequency beams $\gamma 1$ and $\gamma 2$ each retaining the phase difference characteristics of the two corresponding polarized measuring beams $\beta 1$ and $\beta 2$ of frequency $f_1$;

detecting the two separate polarized beat frequency beams $\gamma 1$ and $\gamma 2$;

comparing the phase difference of the two orthogonal linearly polarized beat frequency beams γ1 and γ2 to obtain a phase shift between the two beat frequency beams γ1 and γ2 that corresponds to the phase shift imposed on the two orthogonal linearly polarized measuring beams β1 and β2 by the surface characteristic; and correlating the phase shift to determine the surface characteristic of the moving object.

9. The method of claim 8 in which the correlating step further comprises the step of using the surface characteristic of the moving object as a feedback control to the manufacturing process for the object.

10. The method of claim 1 in which the step of providing an optical interferometer comprises the steps of:

polarizing a coherent monochromatic light beam of frequency $f_0$ into diverging orthogonal linearly polarized first and second light beams;

frequency shifting a difference of $f_m$ the first light beam to a frequency $f_1$;

combining the frequency shifted first light beam with the second light beam;

separating the combined first and second light beams into a third light beam of frequency $f_1$ and a fourth light beam of frequency $f_0$ as diverging orthogonal linearly polarized beams; and directing the third and fourth polarized beams onto separate sites of the object so that surface irregularities of the object impart a phase shift between the third and fourth polarized beams as those beams are reflected from the sites of the surface of the object.

11. The method of 10 further comprising the steps of:

collecting the third and fourth polarized beams reflected from the surface of the object; and combining the collected third and fourth beams.

12. The method of 11 further comprising the steps of:

detecting the beat frequency of a common polarization plane component of the combined third and fourth beams;

referencing the beat frequency component to a reference frequency $f_m$ derived from the frequency shifting the first light beam to obtain a phase shift;

comparing the phase difference to a path length difference; and correlating the path length difference to a surface characteristic of the object.

13. A system for an optical interferometric measuring of a surface characteristic of a moving object during a manufacturing process of the moving object comprising:

optical interferometric measuring means for measuring the surface characteristic of an object moving relative to the optical interferometric measuring means;

mounting means for mounting the optical interferometric measuring means relative to a manufacturing process component for the object;

stabilizing means for stabilizing the object in a beam direction relative to the interferometer during the measuring of the surface characteristic;

comparison means for comparing the measured surface characteristic to a set of standard parameters of desired surface characteristics for the object; and control means connected to the comparison means for controlling the manufacturing process of the object depending on the results of the comparison to the desired surface characteristic standards.

14. The system of claim 13 in which the optical interferometric measuring means comprises:

radiant energy source means for providing a first coherent monochromatic light beam and a second coherent monochromatic light beam of different frequencies; and refracting polarization means for polarizing the second light beam into a third beam and a fourth beam of diverging orthogonal linearly polarized beams and directing the third and fourth polarized beams onto separate sites of the surface of the object so that a phase shift difference occurs between the third and fourth polarized beams as those beams are reflected from the separate sites of the surface of the object.

15. The system of claim 14 in which the radiant energy source means comprises a radiant energy source subsystem comprising:

a monochromatic light beam source for emitting a coherent monochromatic light beam having a forward end and a rearward end and emitting a monochromatic light beam from the forward end; and frequency shifting diffraction means for diffracting the monochromatic light beam such that the first coherent monochromatic light beam comprises a zero order first beam and the second coherent monochromatic light beam comprises a first-order second beam having a different frequency from the zero order first beam.

16. The system of claim 14 in which the refracting polarization means comprises a focusing means for focusing the third and fourth polarized beams onto the surface of the object.

17. The system of claim 16 in which the focusing means comprises collecting means for collecting the reflected third and fourth polarized beams back along the path of the first-order beam.

18. The system of claim 14 further comprising collecting means for collecting the reflected third and fourth polarized beams reflecting from the surface of the moving object.

19. The system of claim 18 in which the collecting means further comprises means for recombining the third and fourth polarized beams as a fifth beam back along the path of the first-order second beam.

20. The system of claim 14 or claim 17 further comprising measuring means for measuring the phase difference between the reflected third and fourth polarized beams.

21. The system of claim 20 in which the measuring means comprises:

comparator means for comparing the phase difference between the third and fourth polarized beams to a path length difference between the third and fourth polarized beams; and correlation means for correlating the difference in path length between the third and fourth polarized beams to a surface characteristic of the moving object.

22. The system of claim 13 further comprising a measuring subsystem comprising:

collecting means for collecting the third and fourth polarized beams reflected from the surface of the moving object;

means for recombining the collected third and fourth polarized beams into a fifth beam of frequency equal to the second beam; and means for superimposing the fifth beam with the first beam as a sixth beam creating a beat frequency within the sixth beam.

23. The system of claim 22 in which the measuring subsystem comprises:

polarization means for polarizing the sixth beam into a seventh beam and an eighth beam of orthogonal linearly polarized beams having the phase difference of the third and fourth polarized beams and the beat frequency of the sixth beam;

comparator means for comparing the phase difference between the seventh and eighth polarized beams to a path length difference between the third and fourth polarized beams; and correlation means for correlating the difference in path length between the third and fourth polarized beams to a surface characteristic of the object.

24. The system of claim 21 further comprising on-line control means for control of a manufacturing process.

25. The system of claim 23 further comprising on-line control means for control of a manufacturing process.

26. The system of claim 19 or claim 22 further comprising frequency shifting means for shifting the frequency of the fifth beam.

27. The system of claim 20 in which the measuring means further comprises frequency shifting means for shifting the frequency of a fifth beam comprised of the recombined third and fourth beams.

28. The system of claim 17 or claim 18 in which the collecting means is selected from a list of collecting means consisting of: a lens, a prism, a mirror, or a retroreflective device.

29. The system of claim 22 in which the collecting means is selected from a list of collecting means consisting of: a lens, a prism, a mirror, or a retroreflective device.

30. The system of claim 13 in which the comparison means comprises surface defect error detection means for detecting a rate of occurrence of surface defects and comparing the rate of occurrence of a surface defect to a set of acceptable rates of defect occurrence.

31. The system of claim 22 in which the means for superimposing the fifth beam and the first beam includes a reflective surface at the monochromatic light beam source forward end.

32. The system of claim 13 in which the optical interferometric measuring means comprises:

radiant energy source means for emitting a coherent monochromatic light beam $\alpha$ with a wavelength $\lambda_0$, the radiant energy source means having a forward end and a rearward end and being configured for emitting radiant energy from the forward end;

frequency shifting diffraction means vibrating at a frequency $f_m$ for diffracting the monochromatic light beam $\alpha$ into a zero order light beam $\alpha$ of a wavelength $\lambda_0$ and a frequency $f_0$ and a first-order light beam $\beta$, the first-order light beam $\beta$ frequency shifted by an amount $f_m$ to frequency $f_1$;

first refracting polarization means aligned to receive beam $\beta$ for polarizing beam $\beta$ into two orthogonal linearly polarized measuring beams $\beta1$ and $\beta2$ having diverging paths;

first refraction means for focusing and receiving the measuring beams $\beta1$ and $\beta2$ such that the measuring beam $\beta1$ impinges the surface of the object to be measured at a position different from to the impingement position of the measuring beam $\beta2$, with the surface of the material reflecting measuring beams $\beta1$ and $\beta2$ so that reflected measuring beams $\beta1$ and $\beta2$ traverse the first polarization means backwards, undergoing recombination into a reflected measuring beam $\gamma$ which traverses the frequency shifting diffraction means in reverse fashion becoming frequency shifted twice $f_m$ to a frequency $f_2$;

reflective means at the forward end of the radiant energy source means for reflecting measuring beam T and superimposing measuring beam $\gamma$ with beam $\alpha$ such that measuring beam $\gamma$ and beam $\alpha$ create a beat frequency interference;

second polarization means aligned to receive the zero order beam $\gamma$ and the interfering reflected measuring beam $\gamma$ for polarizing the beams $\alpha$ and $\gamma$ into a separate orthogonal linearly polarized beam A with components beam $\alpha1$ and beam $\gamma1$ and a beam B with components beam $\alpha2$ and beam $\gamma2$;

first detection means for detecting the twice $f_m$ beat frequency of beam A generating a representative electronic signal A';

second detection means for detecting the twice $f_m$ beat frequency of beam B generating a representative electronic signal B';

electronic means for comparing electronic signal A' with electronic signal B' to obtain a phase difference value; and correlation means for correlating the phase difference value to a difference in path length value between the two measuring beams $\gamma1$ and $\gamma2$.

33. The system of claim 32 further comprising a second correlation means for analyzing the difference in path length value of the two measuring beams $\gamma1$ and $\gamma2$ to derive a value characteristic of the surface of the material measured.

34. The system of claim 33 in which the second correlation means derives a characteristic value for an evaluation of a motion of the material measured.

35. The system of claim 33 further comprising control means connected to the correlation means for creating a feedback control loop from the correlation means to a manufacturing process.

36. The system of claim 13 in which the optical interferometric measuring means further comprises:

radiant energy source means for providing diverging orthogonal linearly polarized first and second light beams of frequency $f_0$;

frequency shifting means for shifting a difference of $f_m$ the frequency of the first beam to a frequency $f_1$;

first combining means for combining the frequency shifted polarized first beam with the second polarized beam; and refracting polarization sensitive separation means for separating the combined first beam and second beam into a third beam and a fourth beam of diverging orthogonal linearly polarized beams and directing the third and fourth polarized beams onto the surface of the moving object so that a phase shift difference occurs between the third and fourth polarized beams as those beams are reflected from the sites of the surface of the object.

37. The system of claim 36 in which the refracting polarization sensitive separation means further comprises a focusing means for focusing the third and fourth polarized beams onto the surface of the moving object.

38. The system of claim 37 in which the focusing means comprises structural means for collecting a reflected third and fourth polarized beams.

39. The system of claim 36 further comprising:

collecting means for collecting and recombining the reflected third and fourth polarized beams reflecting from the surface of the moving object into a superimposed third and fourth beam; and detection means for detecting a common plane component of the superimposed third and fourth beams as a beat frequency fifth beam.

40. The system of claim 39 in which the detection means further comprises:

means for measuring the phase difference occurring between the beat frequency of the fifth beam and a frequency reference equivalent to frequency $f_m$;

comparator means for comparing the phase difference to a path length difference between the third and fourth polarized beams; and correlation means for correlating the difference in path length between the third and fourth polarized beams to a surface characteristic of the moving object.

41. The system of claim 40 further comprising a second correlation means for analyzing the difference in path length between the third and fourth polarized beams to derive a value characteristic of the surface of the material measured.

42. The system of claim 41 in which the second correlation means derives a characteristic value for an evaluation of a motion of the material measured.

\* \* \* \* \*

UNITED STATES PATENT AND TRADEMARK OFFICE
CERTIFICATE OF CORRECTION

PATENT NO.: 5,523,839

DATED: June 4, 1996

INVENTOR(S): Glen M. Robinson, Timothy B. Carlson, Richard W. Peterson, Steven M. Denzer, Robert P. Groschen, Jr., and Michael J. Schmainda It is certified that error appears in the above-identified patent and that said Letters Patent is hereby corrected as shown below:

Col. 4, line 3, "nth" should be --$n^{th}$--.

Col. 14, line 4, "T" should be --$\gamma$--.

Col. 14, line 9, "$\gamma$" should be --$\alpha$--.

Signed and Sealed this

Fourth Day of March, 1997

Attest:

BRUCE LEHMAN

*Attesting Officer*   Commissioner of Patents and Trademarks